US007425966B2

(12) United States Patent
Bastos et al.

(10) Patent No.: US 7,425,966 B2
(45) Date of Patent: Sep. 16, 2008

(54) PIXEL CENTER POSITION DISPLACEMENT

(75) Inventors: Rui M. Bastos, Porto Alegre (BR);
Michael J. M. Toksvig, Palo Alto, CA (US); Karim M. Abdalla, Menlo Park, CA (US)

(73) Assignee: NVIDIA Corporation, Santa Clara, CA (US)

( * ) Notice: Subject to any disclaimer, the term of this patent is extended or adjusted under 35 U.S.C. 154(b) by 359 days.

(21) Appl. No.: 10/960,857

(22) Filed: Oct. 7, 2004

(65) Prior Publication Data

US 2006/0077209 A1    Apr. 13, 2006

(51) Int. Cl.
G09G 5/00 (2006.01)
G06T 11/20 (2006.01)
G06T 15/00 (2006.01)
G06K 9/36 (2006.01)
G00K 9/40 (2006.01)

(52) U.S. Cl. .................. 345/613; 345/614; 345/581; 345/586; 345/552; 382/254; 382/276; 382/300

(58) Field of Classification Search ................. 345/418, 345/42, 426, 428, 581–584, 586, 589, 600–602, 345/606, 536, 611–614, 545, 549, 552, 422, 345/618, 522, 592, 539, 556; 382/254, 266, 382/269, 274, 300, 305
See application file for complete search history.

(56) References Cited

U.S. PATENT DOCUMENTS 5,877,771 A * 3/1999 Drebin et al. ............... 345/586

| 6,768,491 | B2 | 7/2004 | Lefebvre et al. | |
|---|---|---|---|---|
| 6,791,569 | B1 * | 9/2004 | Millet et al. | 345/611 |
| 6,816,167 | B1 * | 11/2004 | Rauchfuss et al. | 345/582 |
| 6,914,609 | B2 * | 7/2005 | Tang et al. | 345/557 |
| 7,050,068 | B1 * | 5/2006 | Bastos et al. | 345/613 |
| 7,064,771 | B1 * | 6/2006 | Jouppi et al. | 345/614 |
| 7,081,903 | B2 * | 7/2006 | McNamara et al. | 345/614 |
| 2002/0097241 | A1 * | 7/2002 | McCormack et al. | 345/423 |
| 2003/0117409 | A1 * | 6/2003 | Lefebvre et al. | 345/581 |

FOREIGN PATENT DOCUMENTS

EP        0 319 165        11/1988
WO    WO 01/20553 A1    3/2001

OTHER PUBLICATIONS

International Search Report, Oct. 24, 2006.

* cited by examiner

*Primary Examiner*—Wesner Sajous
(74) *Attorney, Agent, or Firm*—Patterson & Sheridan, LLP (57) ABSTRACT

A pixel center position that is not covered by a primitive covering a portion of the pixel is displaced to lie within a fragment formed by the intersection of the primitive and the pixel. X,y coordinates of a pixel center are adjusted to displace the pixel center position to lie within the fragment, affecting actual texture map coordinates or barycentric weights. Alternatively, a centroid sub-pixel sample position is determined based on coverage data for the pixel and a multi-sample mode. The centroid sub-pixel sample position is used to compute pixel or sub-pixel parameters for the fragment.

18 Claims, 11 Drawing Sheets

PIXEL CENTER POSITION DISPLACEMENT

FIELD OF THE INVENTION

One or more aspects of the invention generally relate to computer graphics, and more particularly to adjusting pixel center positions in a computer graphics processing pipeline.

BACKGROUND

Figure 1:
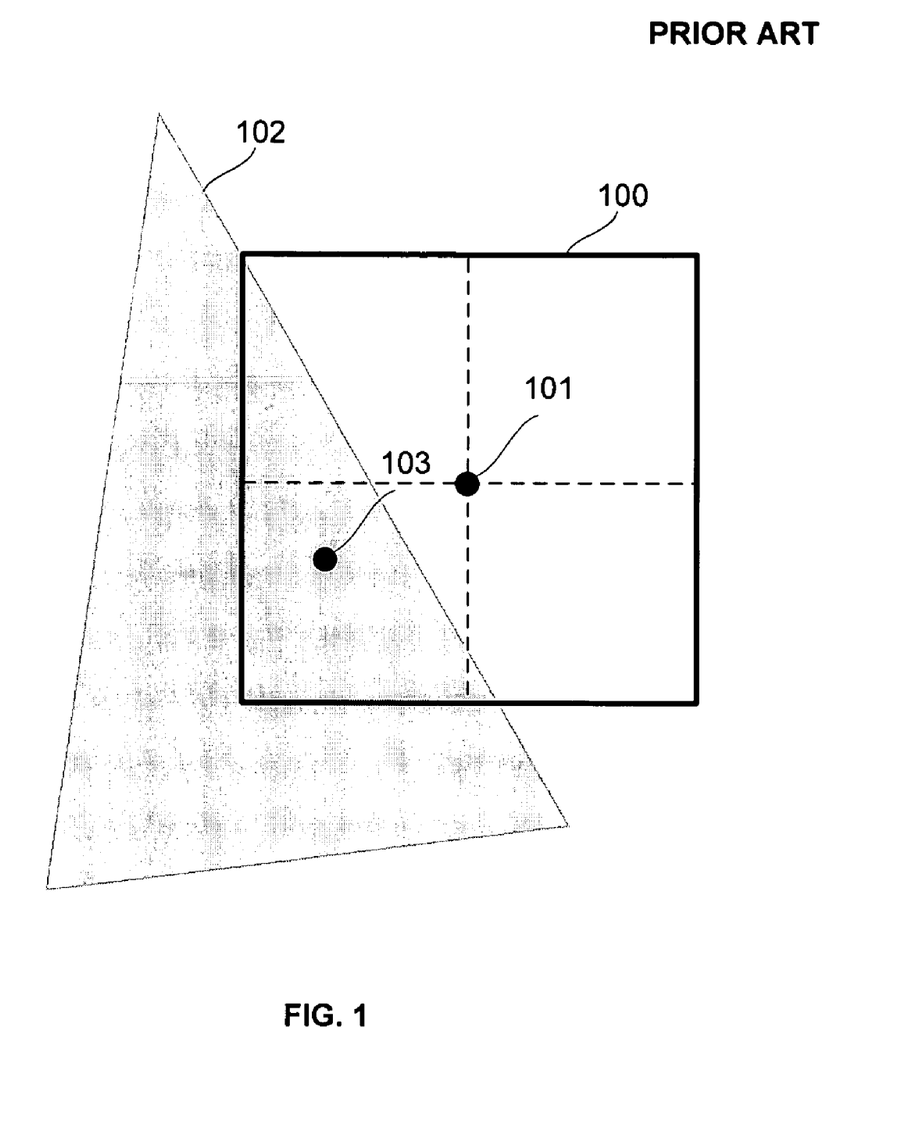
FIG. 1 illustrates a prior art example of a primitive covering a portion of a pixel.

Conventional graphics processors are exemplified by systems and methods developed to reduce aliasing using multisampling techniques that use sub-pixel samples. However, conventionally a pixel center position is used to compute fragment parameters such as color, depth, and texture map coordinates. FIG. 1 illustrates a Primitive 102 covering a portion of a Pixel 100 as is known in the prior art. A Pixel Center Position 101 is not covered by a fragment of Primitive 102, where the fragment is the portion of Primitive 102 covering Pixel 100. A Sub-pixel Sample Position 103 is within the fragment.

When one or more sub-pixel samples are covered by a fragment, but the pixel center position is not covered by the fragment, the computed fragment parameters may be inaccurate, resulting in visual artifacts in an image including the fragment. Specifically, a color discontinuity may be introduced along a primitive boundary when a pixel center position outside of the primitive is used to compute the color for a pixel. For example, the pixel may be brightened or darkened when an incorrect light map is sampled.

There is thus a need for displacing a pixel center position for a pixel such that it lies within a fragment when one or more sub-pixel samples within the pixel are covered by the fragment.

SUMMARY

The current invention involves new systems and methods for determining a displaced fragment center that approximates the centroid of one or more sub-pixel positions covered by the fragment. Using the displaced fragment center to compute texture map coordinates results in higher image quality because texture samples lie within the fragment. Likewise, using the displaced fragment center to compute color components for the fragment results in higher image quality because the colors are computed within the fragment.

Various embodiments of a method of the invention include a method of determining a centroid sub-pixel sample position within a fragment including receiving coverage data for a pixel representing one or more sub-pixel sample positions within a fragment, reading centroid information from a table using the coverage data and a multisample mode, and determining the centroid sub-pixel sample position based on the centroid information.

Various embodiments of the invention include a method of computing a displaced pixel center including determining whether a first barycentric weight is negative, determining whether a second barycentric weight is negative, adjusting the first barycentric weight when the first barycentric weight or the second barycentric weight is negative to produce an adjusted first barycentric weight, adjusting the second barycentric weight when the first barycentric weight or the second barycentric weight is negative to produce an adjusted second barycentric weight, adjusting a third barycentric weight when the first or the second barycentric weight is negative to produce an adjusted third barycentric weight, and combining the adjusted third barycentric weight, the adjusted second barycentric weight, and the adjusted first barycentric weight to produce the displaced pixel center.

Various embodiments of the invention include a centroid computation unit including a storage element, a centroid control unit, and a parameter computation unit. The storage element is configured to store centroid information. The centroid control unit is configured to read the centroid information based a multisample mode and coverage data associated with a fragment. The parameter computation unit is coupled to the centroid computation unit and configured to compute a fragment parameter based on the centroid information.

Various embodiments of the invention include a computing system. The computing system includes a host processor, a host memory, a system interface, and a graphics processor. The host memory stores programs for the host processor. The system interface is configured to interface with the host processor and the graphics processor. The graphics processor includes a centroid computation unit.

BRIEF DESCRIPTION OF THE VARIOUS VIEWS OF THE DRAWINGS

Accompanying drawing(s) show exemplary embodiment(s) in accordance with one or more aspects of the present invention; however, the accompanying drawing(s) should not be taken to limit the present invention to the embodiment(s) shown, but are for explanation and understanding only.

DISCLOSURE OF THE INVENTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

Figure 2:
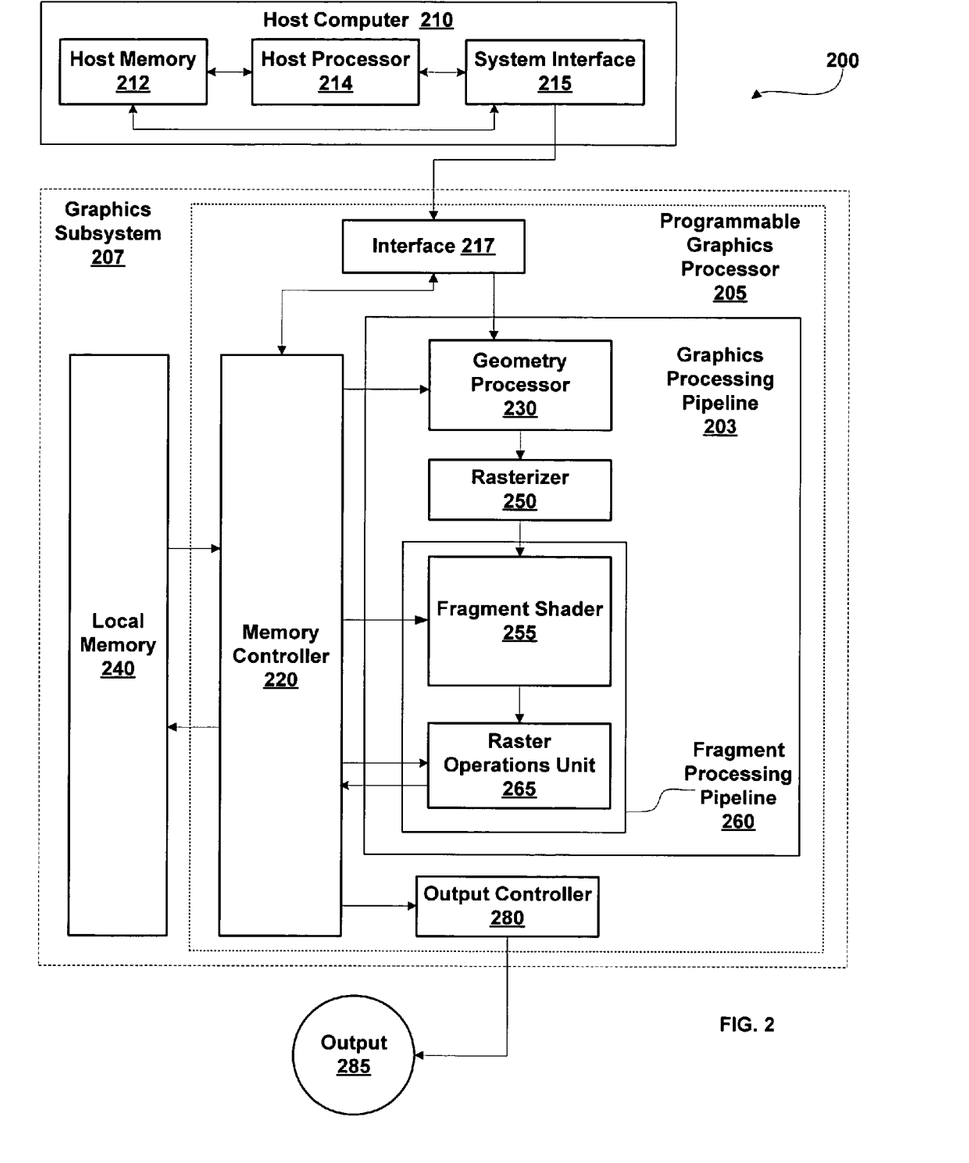
FIG. 2 is a block diagram of an exemplary embodiment of a respective computer system in accordance with one or more aspects of the present invention including a host computer and a graphics subsystem.

FIG. 2 is a block diagram of an exemplary embodiment of a Computing System generally designated 200 and including a Host Computer 210 and a Graphics Subsystem 207. Computing System 200 may be a desktop computer, server, laptop computer, palm-sized computer, tablet computer, game console, portable wireless terminal such as a personal digital assistant (PDA) or cellular telephone, computer based simulator, or the like. Host computer 210 includes Host Processor 214 that may include a system memory controller to interface directly to Host Memory 212 or may communicate with Host Memory 212 through a System Interface 215. System Interface 215 may be an I/O (input/output) interface or a bridge device including the system memory controller to interface directly to Host Memory 212. An example of System Interface 215 known in the art includes Intel® Northbridge.

Host computer 210 communicates with Graphics Subsystem 207 via System Interface 215 and an Interface 217. Graphics Subsystem 207 includes a Local Memory 240 and a Programmable Graphics Processor 205. Programmable Graphics Processor 205 uses memory to store graphics data and program instructions, where graphics data is any data that is input to or output from computation units within Programmable Graphics Processor 205. Graphics memory is any memory used to store graphics data or program instructions to be executed by Programmable Graphics Processor 205. Graphics memory can include portions of Host Memory 212, Local Memory 240 directly coupled to Programmable Graphics Processor 205, storage resources coupled to the computation units within Programmable Graphics Processor 205, and the like. Storage resources can include register files, caches, FIFOs (first in first out) memories, and the like.

In addition to Interface 217, Programmable Graphics Processor 205 includes a Graphics Processing Pipeline 203, a Memory Controller 220 and an Output Controller 280. Data and program instructions received at Interface 217 can be passed to a Geometry Processor 230 within Graphics Processing Pipeline 203 or written to Local Memory 240 through Memory Controller 220. In addition to communicating with Local Memory 240, and Interface 217, Memory Controller 220 also communicates with Graphics Processing Pipeline 203 and Output Controller 280 through read and write interfaces in Graphics Processing Pipeline 203 and a read interface in Output Controller 280.

Within Graphics Processing Pipeline 205, Geometry Processor 230 and a programmable graphics fragment processing pipeline, Fragment Processing Pipeline 260, perform a variety of computational functions. Some of these functions are table lookup, scalar and vector addition, multiplication, division, coordinate-system mapping, calculation of vector normals, tessellation, calculation of derivatives, interpolation, and the like. Geometry Processor 230 and Fragment Processing Pipeline 260 are optionally configured such that data processing operations are performed in multiple passes through Graphics Processing Pipeline 203 or in multiple internal passes through Fragment Processing Pipeline 260. Each pass through Programmable Graphics Processor 205, Graphics Processing Pipeline 203 or Fragment Processing Pipeline 260 concludes with optional processing by a Raster Operations Unit 265.

Vertex programs are sequences of vertex program instructions compiled by Host Processor 214 for execution within Geometry Processor 230 and Rasterizer 250. Fragment programs are sequences of fragment program instructions compiled by Host Processor 214 for execution within Fragment Processing Pipeline 260. Geometry Processor 230 receives a stream of program instructions (vertex program instructions and fragment program instructions) and data from Interface 217 or Memory Controller 220, and performs vector floating-point operations or other processing operations using the data. The program instructions configure subunits within Geometry Processor 230, Rasterizer 250 and Fragment Processing Pipeline 260. The program instructions and data are stored in graphics memory, e.g., portions of Host Memory 212, Local Memory 240, or storage resources within Programmable Graphics Processor 205. When a portion of Host Memory 212 is used to store program instructions and data the portion of Host Memory 212 can be uncached so as to increase performance of access by Programmable Graphics Processor 205. Alternatively, configuration information is written to registers within Geometry Processor 230, Rasterizer 250 and Fragment Processing Pipeline 260 using program instructions, encoded with the data, or the like.

Data processed by Geometry Processor 230 and program instructions are passed from Geometry Processor 230 to a Rasterizer 250. Rasterizer 250 is a sampling unit that processes graphics primitives and generates sub-primitive data, such as pixel data or fragment data, including coverage data. Coverage data indicates which sub-pixel sample positions within a pixel are "covered" by a fragment formed by the intersection of the pixel and a primitive. Graphics primitives include geometry, such as points, lines, triangles, quadrilaterals, meshes, surfaces, and the like. Rasterizer 250 converts graphics primitives into sub-primitive data, performing scan conversion on the data processed by Geometry Processor 230. Rasterizer 250 uses a set of fixed or programmed sub-pixel sample positions, the set is specified by a multisample mode. Rasterizer 250 outputs fragment data and fragment program instructions to Fragment Processing Pipeline 260.

The fragment programs configure the Fragment Processing Pipeline 260 to process fragment data by specifying computations and computation precision. Fragment Shader 255 is optionally configured by fragment program instructions such that fragment data processing operations are performed in multiple internal passes within Fragment Shader 255. In some embodiments of the invention, the coverage data and multisample mode are used by Fragment Shader 255 to displace a pixel center position that does not lie within a fragment, producing a displaced pixel center, as described further herein. Fragment Shader 255 computes and processes sub-pixel color values for one or more sub-pixel sample positions using the displaced pixel center. In other embodiments of the invention, barycentric weights are adjusted to displace the pixel center position, as described further herein, and the adjusted barycentric weights are used to compute fragment parameters for one or more sub-pixel sample positions within the fragment. Fragment Shader 255 computes fragment parameters, e.g., color data, depth data, texture map coordinates, and the like. The fragment parameters are further processed to produce processed fragment data, e.g., color and depth.

When the fragment parameters are computed using the displaced pixel center, each fragment parameter is computed at a position within the fragment and the occurrence of visual artifacts, such as, color discontinuities along a primitive edge, is reduced. Fragment Shader 255 outputs processed fragment data and codewords generated from fragment program instructions to Raster Operations Unit 265. When configured to perform multisampling, Raster Operations Unit 265 computes sub-pixel depth values for each sub-pixel sample position using fragment depth data received from Fragment Shader 255 and sub-pixel sample positions specified by the multisample mode. In an alternate embodiment, sub-pixel depth values are computed within Fragment Shader 255.

In one embodiment Raster Operations Unit 265 replicates the fragment data, such as color, received from Fragment Shader 255 for each sub-pixel sample position. In another embodiment Raster Operations Unit 265 receives sub-pixel data for each sub-pixel sample from Fragment Shader 255. Processing sub-pixel color values may reduce color space aliasing resulting from color variations between sub-pixel sample positions within a pixel, further improving image quality Raster Operations Unit 265 includes a read interface and a write interface to Memory Controller 220 through which Raster Operations Unit 265 accesses data stored in Local Memory 240 or Host Memory 212. Raster Operations Unit 265 optionally performs near and far plane clipping and raster operations, such as stencil, z test, blending, and the like, using the sub-pixel fragment data and pixel data stored in Local Memory 240 or Host Memory 212 at a pixel position (image location specified by x,y coordinates) associated with the processed fragment data. The output data from Raster Operations Unit 265 is written back to Local Memory 240 or Host Memory 212 at the pixel position associated with the output data and the results, e.g., image data are saved in graphics memory.

When processing is completed, an Output 285 of Graphics Subsystem 207 is provided using Output Controller 280. Alternatively, Host Processor 214 reads the image stored in Local Memory 240 through Memory Controller 220, Interface 217 and System Interface 215. Output Controller 280 is optionally configured by opcodes to deliver data to a display device, network, electronic control system, other computing system, such as another Computing System 200, other graphics subsystem, such as another Graphics Subsystem 207, or the like. Furthermore, Output Controller 280 is optionally configured by opcodes to downfilter the image data, e.g., multi-sampled color data, combining the sub-pixel samples within each pixel to produce filtered pixels for display. In an alternate embodiment, the multi-sampled color data is downfiltered by rendering geometry data and mapping the multi-sampled color data onto the geometry as a texture map. In the alternate embodiment, downfiltering is accomplished using texture map filtering, e.g., trilinear, anisotropic, and the like, within Fragment Shader 255.

Figure 3A:
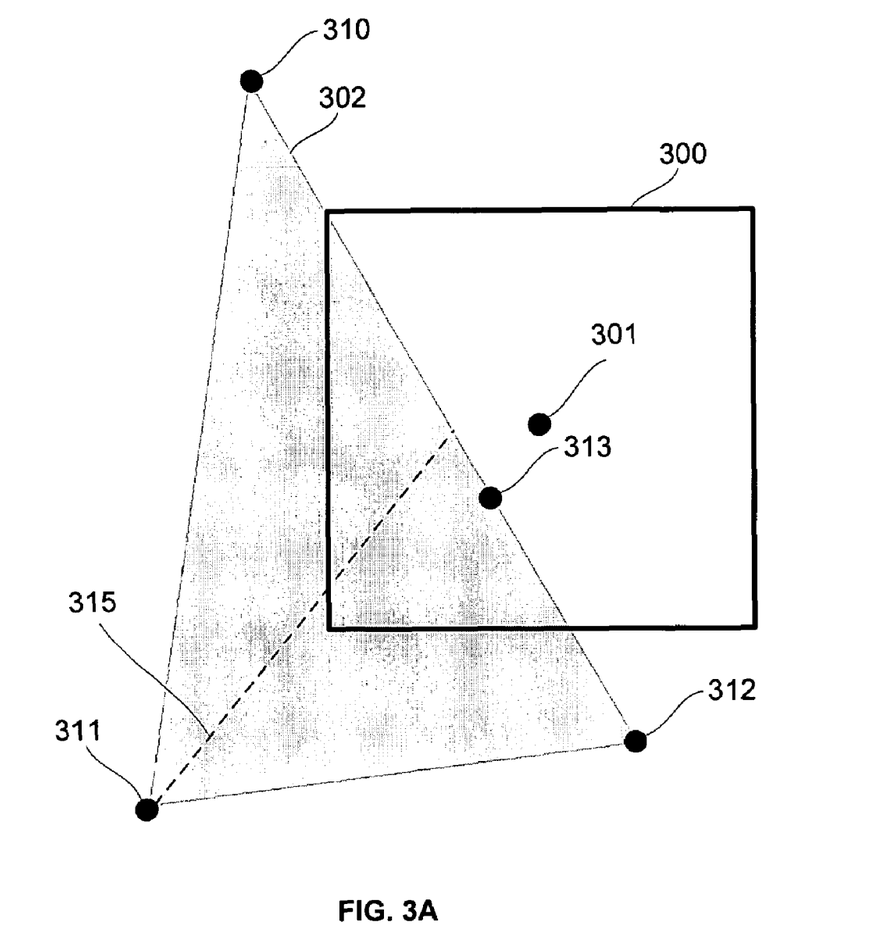
FIG. 3A illustrates displacement of a pixel center position to an edge of a fragment in accordance with one or more aspects of the present invention.

FIG. 3A illustrates displacement of a Pixel Center Position 301 to an edge of a fragment in accordance with one or more aspects of the present invention. Any position within a Primitive 302 (including positions along an edge) may be defined using barycentric weights and vertices of Primitive 302, a Vertex 310, a Vertex 311, and a Vertex 312:

position=$w_0$(Vertex 310)+$w_1$(Vertex 311)+$w_2$(Vertex 312).

Each barycentric weight, $w_0$, $w_1$, and $w_2$ is greater than or equal to 0 and less than or equal to 1 for any position within Primitive 302 and the sum of the barycentric weights is 1. Each position is associated with a unique set of barycentric weights. For a position outside of Primitive 302, such as a Pixel Center Position 301 within a Pixel 300, at least one barycentric weight is negative. Pixel Center Position 301 may be displaced to a Displaced Pixel Center 313 by redistributing each negative barycentric weight to each positive barycentric weight so that all of the barycentric weights are positive, as further described in conjunction with FIG. 3C. For example, when the negative barycentric weight, $w_1$ is redistributed to $w_0$ and $w_2$ Pixel Center Position 301 moves parallel to a Line 315 to Displaced Pixel Center 313.

Figure 3B:
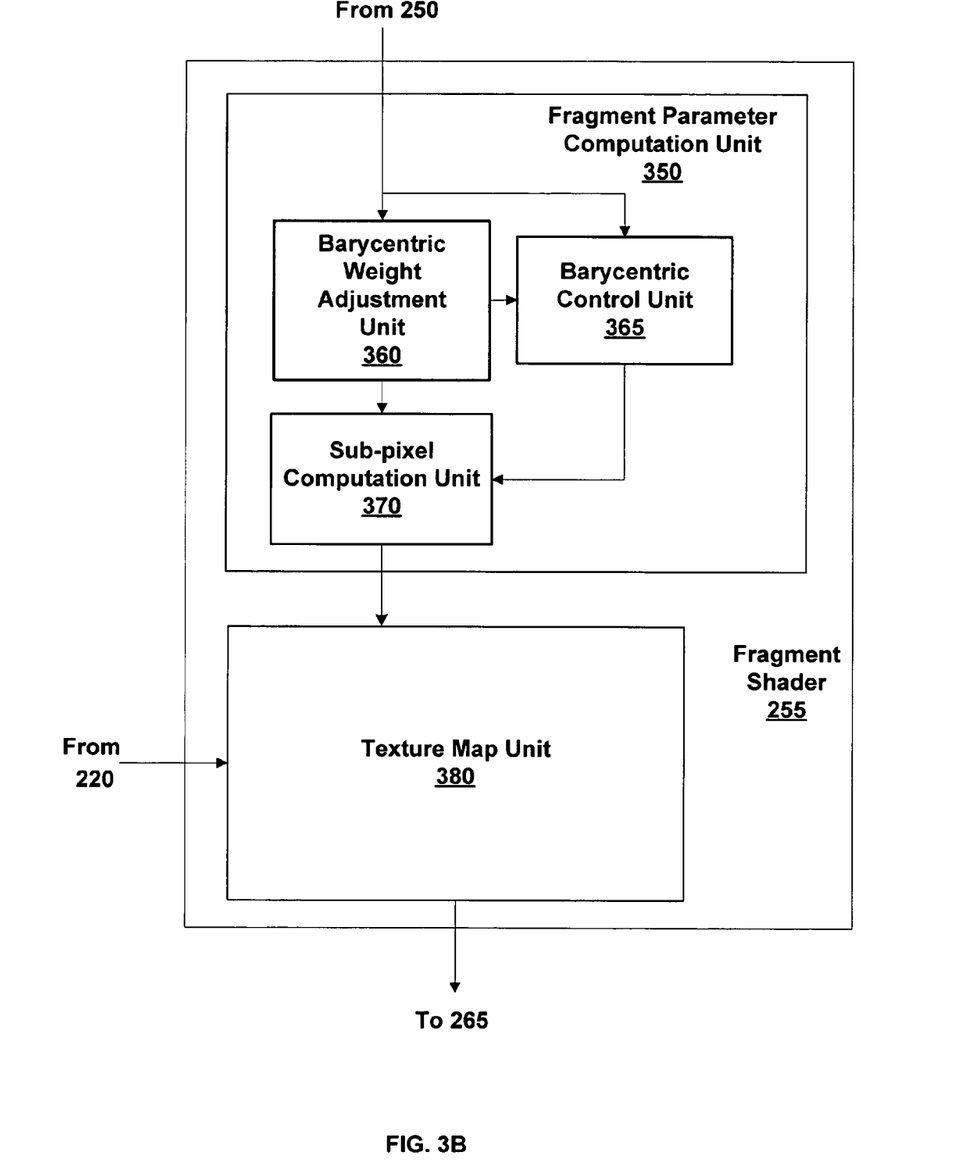
FIG. 3B is a block diagram of an exemplary embodiment of a fragment parameter computation unit in accordance with one or more aspects of the present invention.

FIG. 3B is a block diagram of an exemplary embodiment of a Fragment Parameter Computation Unit 350 within Fragment Shader 255 in accordance with one or more aspects of the present invention. Fragment Parameter Computation Unit 350 receives fragment program instructions and fragment data associated with a pixel, including coverage data and barycentric weights, from Rasterizer 250. A Barycentric Weight Adjustment Unit 360 determines if a pixel center position for the pixel is within the fragment, according to the coverage data, and produces adjusted barycentric weights. When the pixel center position is not within the fragment, a displaced pixel center is determined, as described in conjunction with FIG. 3C. Otherwise, the adjusted barycentric weights are equal to the barycentric weights received from Rasterizer 250.

A Sub-pixel Computation Unit 370 receives the adjusted barycentric weights from Barycentric Weight Adjustment Unit 360 and sub-pixel sample positions from a Barycentric Control Unit 365. The sub-pixel sample positions are specified by a multisample mode and may be programmed or static. Sub-pixel Computation Unit 370 computes one or more fragment parameters for each sub-pixel sample position using the adjusted barycentric weights and sub-pixel sample positions. In an alternate embodiment, one or more fragment parameters are computed only for the displaced pixel center and replicated in Rasterizer Operations Unit 265 for each sub-pixel sample position.

Figure 3C:
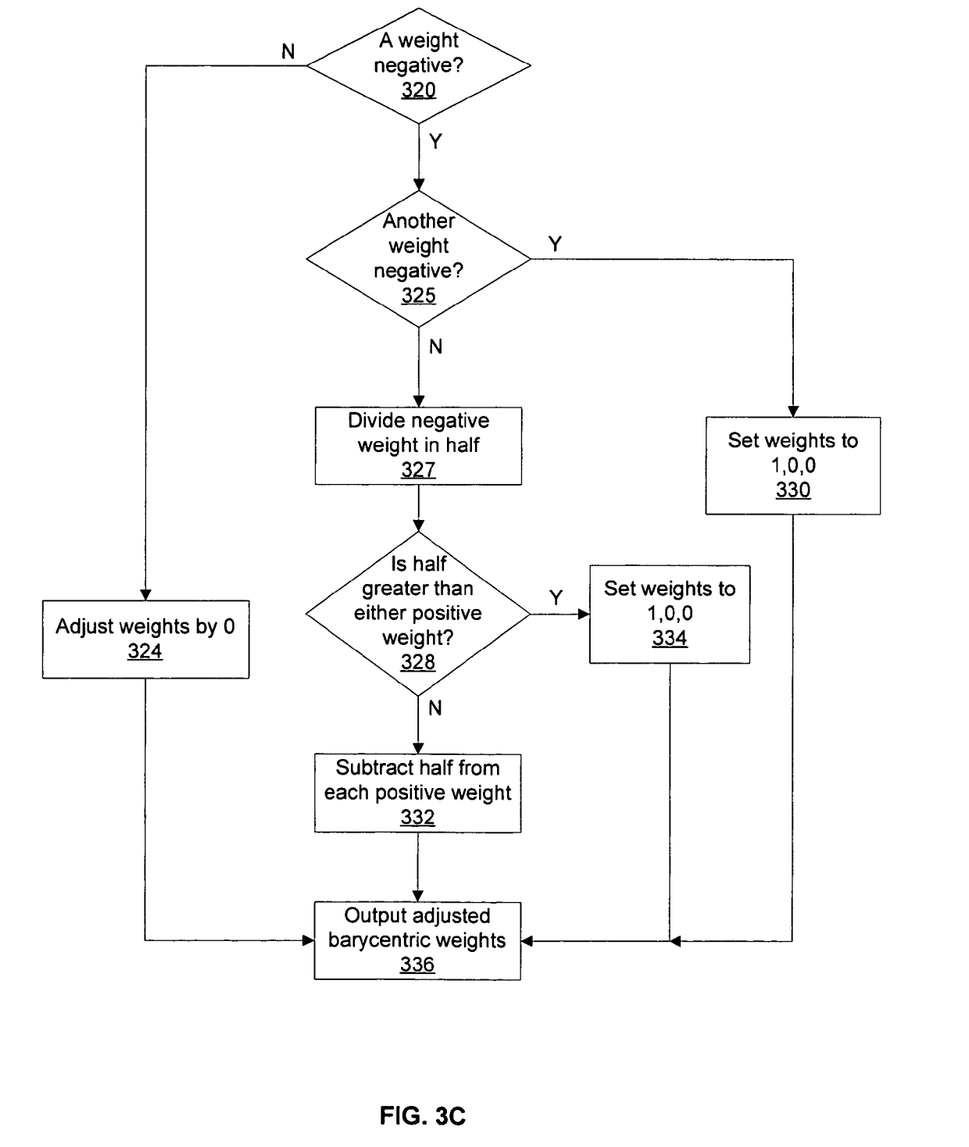
FIG. 3C illustrates an embodiment of a method of displacing a pixel center position in accordance with one or more aspects of the present invention.

FIG. 3C illustrates an embodiment of a method of displacing a pixel center position, such as Pixel Center Position 301, in accordance with one or more aspects of the present invention. In step 320 Barycentric Weight Adjustment Unit 360 determines if at least one of the barycentric weights for a pixel center position is negative, and, if not, then in step 324 Barycentric Weight Adjustment Unit 360 sets each of the adjusted barycentric weights to its respective barycentric weight received from Rasterizer 250. If, in step 320 Barycentric Weight Adjustment Unit 360 determines at least one of the barycentric weights for a pixel center position is negative, then, in step 325 Barycentric Weight Adjustment Unit 360 determines if two barycentric weights are negative, and, if so, then in step 330 Barycentric Weight Adjustment Unit 360 adjusts each of the negative barycentric weights to 0 and adjusts the non-negative barycentric weight to 1.

If, in step 325 Barycentric Weight Adjustment Unit 360 determines two barycentric weights are not negative, i.e., only one barycentric weight is negative and two barycentric weights are non-negative, then, in step 327 Barycentric Weight Adjustment Unit 360 divides the negative barycentric weight in half to produce a half weight distribution. In step 328 Barycentric Weight Adjustment Unit 360 determines if the absolute value of the half weight distribution is greater than either of the non-negative barycentric weights, and, if so, in step 334 Barycentric Weight Adjustment Unit 360 adjusts the negative barycentric weight and the lesser of the non-negative barycentric weights to 0 and greater of the non-negative barycentric weights to 1.

If, in step 328 Barycentric Weight Adjustment Unit 360 determines the absolute value of the half weight distribution is not greater than either of the non-negative barycentric weights, then, in step 332 Barycentric Weight Adjustment Unit 360 adjusts the negative barycentric weight to 0. Barycentric Weight Adjustment Unit 360 sums the half weight distribution with each of the non-negative barycentric weights to produce the remaining adjusted barycentric weights. Following steps 330, 332, 334, and 324, Barycentric Weight Adjustment Unit 360 outputs the adjusted barycentric weights to Sub-pixel Computation Unit 370. Persons skilled in the art will appreciate that any system configured to perform the method steps of FIG. 3C, or their equivalents, is within the scope of the present invention.

Figure 4A:
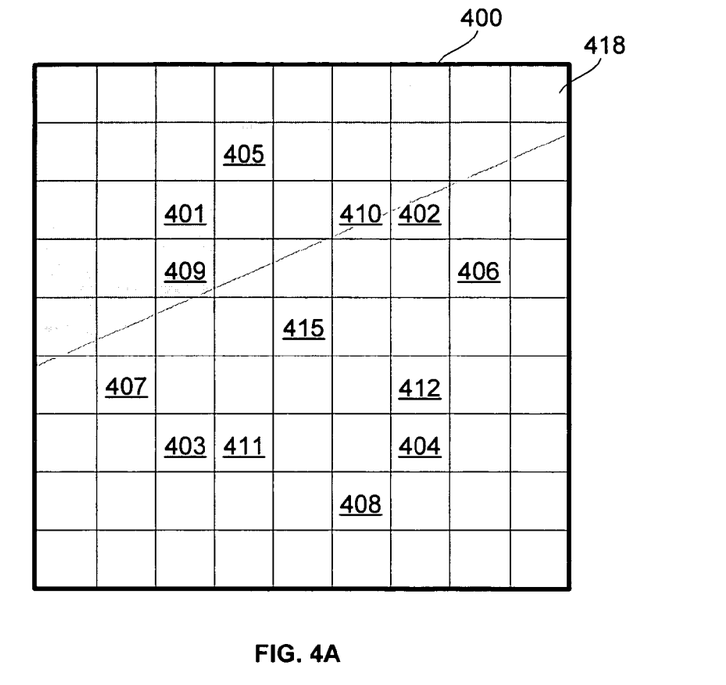
FIGS. 4A, 4B, 4C, and 4D illustrate sub-pixel positions of samples within pixels in accordance with one or more aspects of the present invention.

FIG. 4A illustrates sub-pixel sample positions within pixels in accordance with one or more aspects of the present invention. A Pixel 400 includes a Pixel Center Position 415 and 8 sub-pixel sample positions, a Sample Position 401, a Sample Position 402, a Sample Position 403, a Sample Position 404, a Sample Position 405, a Sample Position 406, a Sample Position 407, and a Sample Position 408. Pixel Center Position 415 is also a sub-pixel sample position, so there are 9 sub-pixel sample positions. Additionally, Pixel 400 includes 4 centroid sample positions, a Centroid Sample Position 409, a Centroid Sample Position 410, a Centroid Sample Position 411, and a Centroid Sample Position 412. When Pixel Center Position 415 is not covered by a fragment, such as Fragment 418, a centroid sample position or a sample position may be used as a displaced pixel center, i.e., centroid sub-pixel sample position. The centroid sub-pixel sample position is used to compute one or more fragment parameters at any of the sub-pixel sample positions. For example, a fragment parameter may be computed by evaluating a plane equation that defines the value of the parameter for any sub-sample position within the fragment, as described in conjunction with FIG. 5C.

Figure 4B:
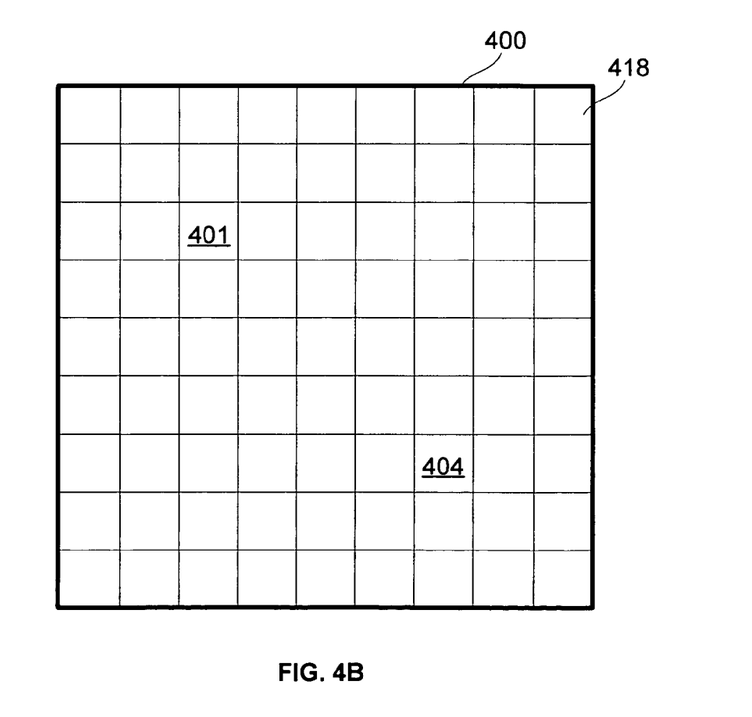

Some embodiments of the present invention include additional sub-pixel sample positions within Pixel 400 positioned at any location within Pixel 400. Other embodiments of the present invention include fewer sub-pixel sample positions within Pixel 400. Furthermore, a subset of the sub-pixel sample positions may be specified by each multisample mode. For example, a first multisample mode uses only Pixel Center Position 415. Sub-pixel sample positions within Pixel 400 are shown for three other multisample modes in FIGS. 4B, 4C, and 4D. A second multisample mode, shown in FIG. 4B, uses only Sample Position 401 and Sample Position 404. A third multisample mode, shown in FIG. 4C, uses only Sample Position 401, Sample Position 402, Sample Position 403, and Sample Position 404. A fourth multisample mode, shown in FIG. 4D, uses only Sample Position 405, Sample Position 406, Sample Position 407, and Sample Position 408. Other embodiments of the present invention may include additional multisample modes.

Figure 5A:
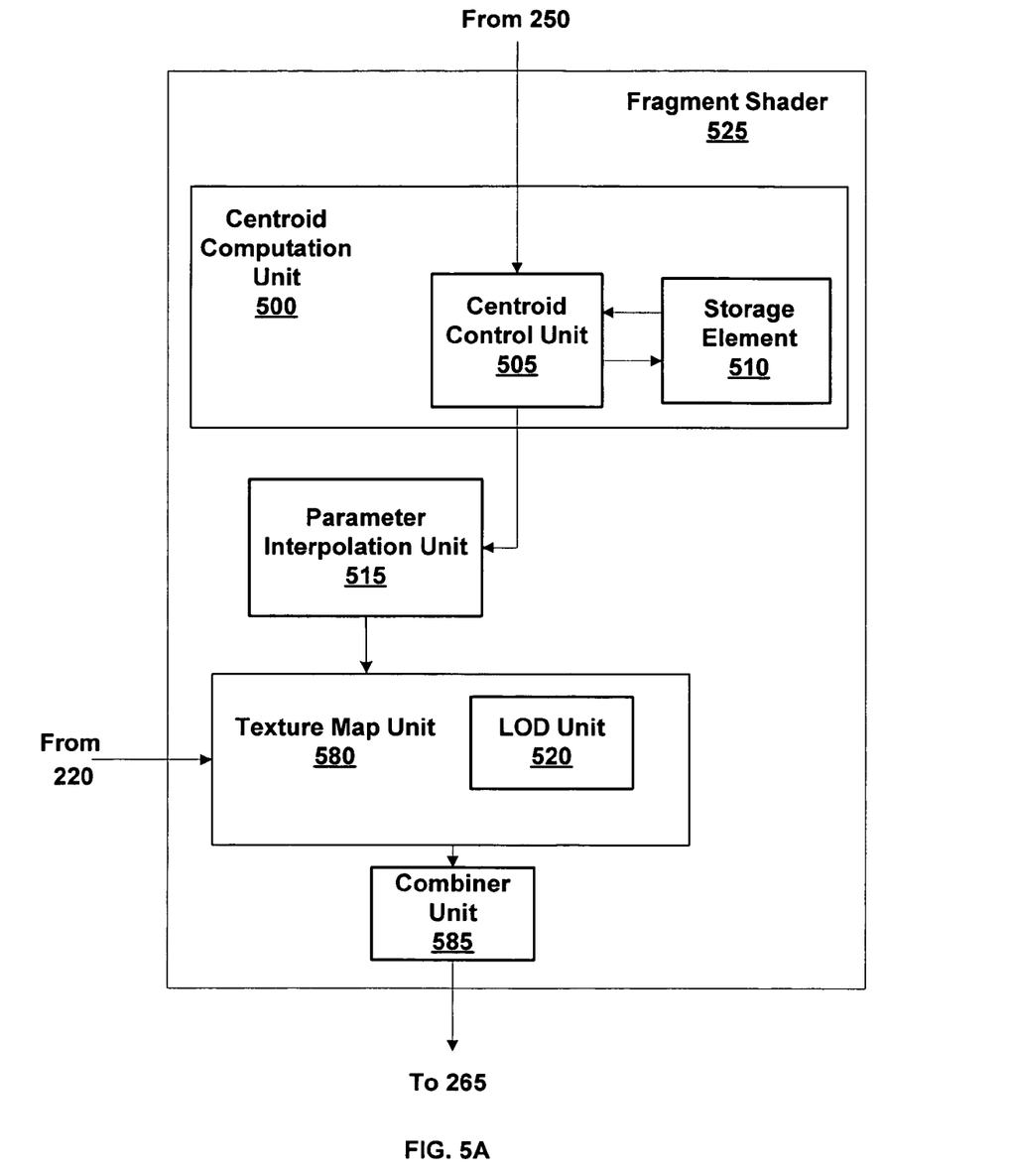
FIG. 5A is a block diagram of an exemplary embodiment of a fragment shader including a centroid computation unit in accordance with one or more aspects of the present invention.

FIG. 5A is a block diagram of an exemplary embodiment of a Centroid Computation Unit 500 within an alternate embodiment of Fragment Shader 255, Fragment Shader 525, in accordance with one or more aspects of the present invention. Centroid Computation Unit 500 receives coverage data for a pixel from Rasterizer 250 and produces centroid information used to determine a centroid sub-pixel sample position. A centroid sub-pixel sample position may be a sample position or a centroid sample position. In an alternate embodiment, Centroid Computation Unit 500 is included within Rasterizer 250.

A Storage Element 510 within Centroid Computation Unit 500 receives the coverage data from Rasterizer 250 and the multisample mode from a Centroid Control Unit 505 and outputs the centroid information, e.g., a centroid sub-pixel sample position or pixel center offset. In another alternate embodiment, Storage Element 510 outputs a centroid sub-pixel sample position. In another alternate embodiment, Storage Element 510 outputs a pixel center offset which is used to compute the centroid sub-pixel sample position. Storage Element 510 may include one or more register file, read only memory (ROM), random access memory (RAM), and the like.

Centroid information stored in Storage Element 510 may be static or programmed (determined and loaded by a software driver). Centroid Control Unit 505 generates a write control signal to load the centroid information into Storage Element 510. When configured to write to Storage Element 510, Centroid Control Unit 505 receives the centroid information, address, and a write instruction from Rasterizer 250. Otherwise, Centroid Control Unit 505 receives fragment program instructions and fragment data from Rasterizer 250. The fragment data may include pixel position information (x,y), coverage data, primitive data, such as barycentric weights, and the like.

In some embodiments, when the first multisample mode Sample Position 415 is used as the centroid sub-pixel sample position if it is covered by the fragment. Otherwise, when the first multisample mode is used and Sample Position 415 is not covered, the fragment is "killed", i.e., not output by Fragment Shader 525 to Raster Operations Unit 265, for the pixel. When all of the sub-pixel sample positions for any multisample mode are covered by the fragment, the pixel center position is the centroid sub-pixel sample position. Furthermore, when a multisample mode is used that specifies more than one sub-pixel sample position and a single sub-pixel sample position is covered by the fragment, the single sub-pixel sample position is the centroid sub-pixel sample position. Table 1 includes an embodiment of the centroid sub-pixel sample positions, indexed using the coverage data, for the second multisample mode shown in FIG. 4B.

TABLE 1

Centroid sub-pixel samples positions for the second multisample mode

| Coverage data | Centroid sub-pixel sample position |
|---|---|
| Sample Position 401 | Sample Position 401 |
| Sample Position 404 | Sample Position 404 |
| Sample Positions 401 and 404 | Sample Position 415 |

Figure 4C:
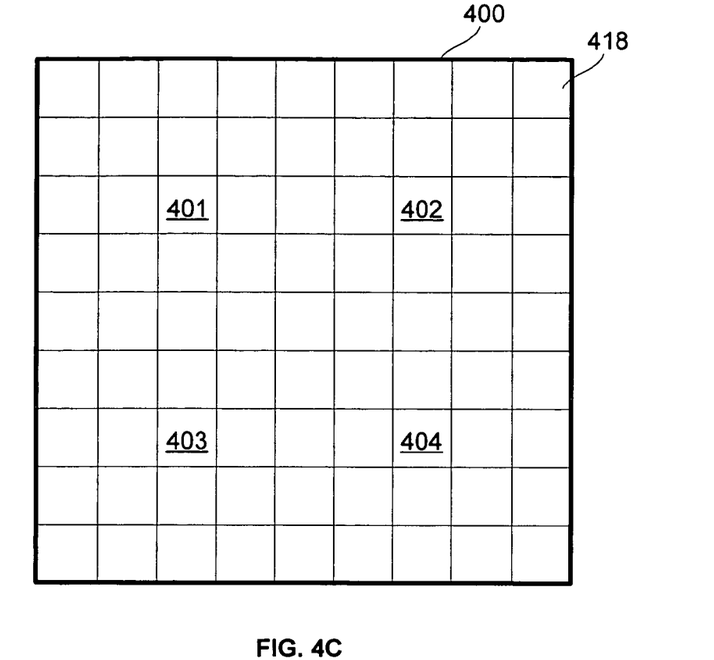

Table 2 includes an embodiment of the centroid sub-pixel sample positions, indexed using the coverage data, for the third multisample mode shown in FIG. 4C.

TABLE 2

Centroid sub-pixel samples positions for the third multisample mode

| Coverage data | Centroid sub-pixel sample position |
|---|---|
| Sample Position 401 | Sample Position 401 |
| Sample Position 402 | Sample Position 402 |
| Sample Position 403 | Sample Position 403 |
| Sample Position 404 | Sample Position 404 |
| Sample Positions 401 and 402 | Centroid Sample Position 410 |
| Sample Positions 403 and 401 | Centroid Sample Position 409 |
| Sample Positions 402 and 404 | Centroid Sample Position 412 |
| Sample Positions 403 and 404 | Centroid Sample Position 411 |
| Any 3 of 4 sample positions | Sample Position 415 |

TABLE 2-continued

Centroid sub-pixel samples positions for the third multisample mode

| Coverage data | Centroid sub-pixel sample position |
|---|---|
| All 4 sample positions | Sample Position 415 |

Figure 4D:
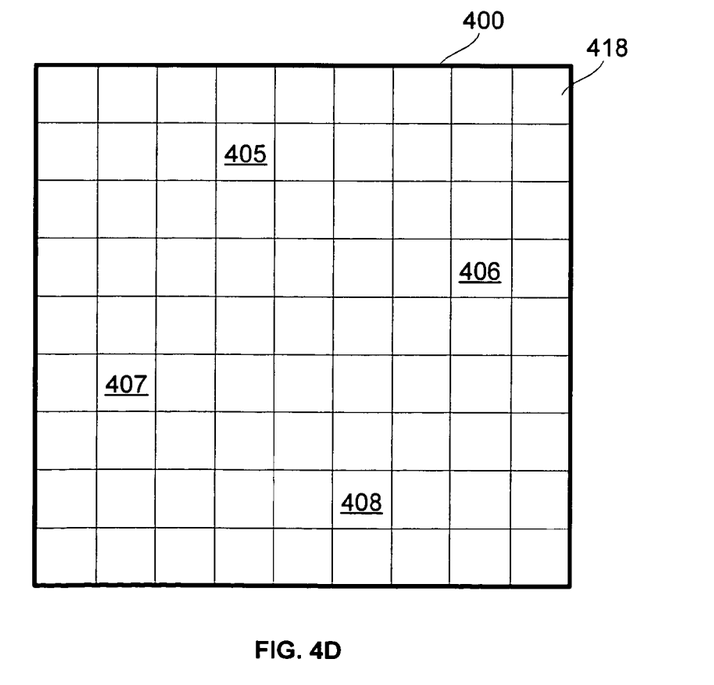

Table 3 includes an embodiment of the centroid sub-pixel sample positions, indexed using the coverage data, for the third multisample mode shown in FIG. 4D.

TABLE 3

Centroid sub-pixel samples positions for the fourth multisample mode

| Coverage data | Centroid sub-pixel sample position |
|---|---|
| Sample Position 405 | Sample Position 405 |
| Sample Position 406 | Sample Position 406 |
| Sample Position 407 | Sample Position 407 |
| Sample Position 408 | Sample Position 408 |
| Sample Positions 405 and 406 | Centroid Sample Position 410 |
| Sample Positions 405 and 407 | Centroid Sample Position 409 |
| Sample Positions 406 and 408 | Centroid Sample Position 412 |
| Sample Positions 407 and 408 | Centroid Sample Position 411 |
| Any 3 of 4 sample positions | Sample Position 415 |
| All 4 sample positions | Sample Position 415 |

Those skilled in the art will recognize that different centroid sample positions, placed at different locations within Pixel 400, may be used for the first, second, third, and fourth multisample modes and that other sub-pixel sample positions may be included in additional multisample modes. In other embodiments, Tables 1, 2, and 3 include pixel center offsets instead of or in addition to the centroid sub-pixel sample positions. For example, a pixel center offset corresponding to Sample Position 405 is (−1,−3) when Pixel Center Position 415 is located at (0,0). A pixel center offset may be combined with a pixel center position to compute the centroid sub-pixel sample position. Conversely, the centroid sub-pixel sample position may be combined with the pixel center position to compute the pixel center offset.

Storage Element 510 outputs centroid information, e.g., a pixel center offset or a centroid sub-pixel sample position, to Centroid Control Unit 505. Centroid Control Unit 505 outputs the centroid information, the fragment data, and the fragment program instructions to a Parameter Interpolation Unit 515. Centroid Control Unit 505 may also output the multisample mode to Parameter Interpolation Unit 515. Parameter Interpolation Unit 515 computes one or more parameters for each fragment, as described in conjunction with FIG. 5C, and outputs the fragment parameters and the fragment program instructions to a Texture Map Unit 515. In one embodiment, Parameter Interpolation Unit 515 computes color parameters for the centroid sub-pixel sample position and texture parameters for each sub-pixel sample position specified by the multisample mode that is covered by the fragment. In another embodiment, Parameter Interpolation Unit 515 computes color parameters and texture parameters for each sub-pixel sample position specified by the multisample mode that is covered by the fragment.

In addition to the fragment parameters and fragment program instructions, in some embodiments, Parameter Interpolation Unit 515 outputs the centroid information to Texture Map Unit 580. In those embodiments, the centroid information is used by LOD (level of detail) Unit 520 to compute a texture map LOD, i.e., the LOD is computed using a modified (centroid sub-pixel sample position based) grid rather than a uniform (pixel center position based) grid. Specifically, texture parameter gradients are determined using texture parameters computed using pixel offsets or centroid sub-pixel sample positions. In other embodiments, texture map parameters computed based on pixel center positions are used to compute the texture map LOD using techniques known to those skilled in the art.

Texture Map Unit 580 combines the fragment parameters computed using the centroid sub-pixel sample position and the LOD to determine texture map coordinates and corresponding addresses. The addresses are output to Memory Controller 220 with read requests and Memory Controller 220 returns one or more texture samples. The texture samples are filtered according to a filter mode to produce a filtered texture sample for the fragment. Alternatively, the texture samples are filtered to produce a filtered texture sample for each sub-pixel sample position within the fragment. A Combiner Unit 585 combines the filtered texture sample with other fragment data generated using the fragment parameters, such as color, and outputs processed fragment data to Rasterizer Operations Unit 265.

Figure 5B:
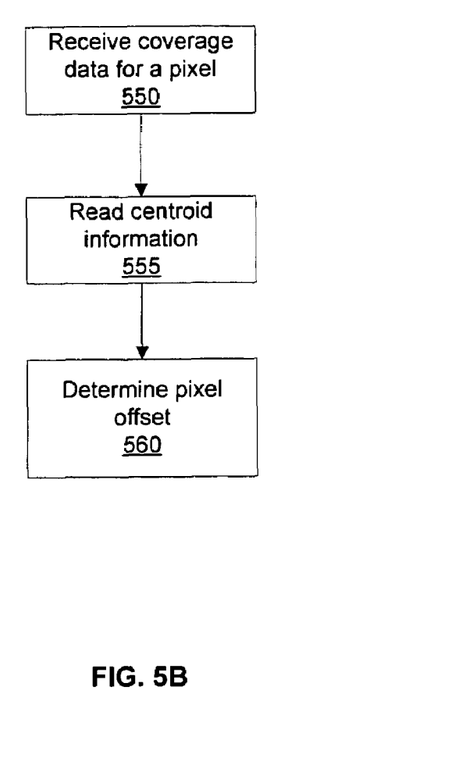
FIG. 5B illustrates an embodiment of method of determining a centroid sub-pixel sample position in accordance with one or more aspects of the present invention.

FIG. 5B illustrates an embodiment of a method of determining a centroid sub-pixel position in accordance with one or more aspects of the present invention. In step 550 Centroid Computation Unit 500 receives coverage data for a pixel. In step 555 Centroid Control Unit 505 reads an entry in Storage Element 510 using the coverage data and multisample mode. In some embodiments, Storage Element 510 includes a table for each multisample mode, such as Tables 1, 2, and 3. In other embodiments a single table includes the centroid information for several multisample modes.

In step 560 Centroid Control Unit 505 receives the centroid information and outputs the centroid information to Parameter Interpolation Unit 515. Parameter Interpolation Unit 515 determines the pixel offset using the centroid information. In an alternate embodiment, Parameter Interpolation Unit 515 determines the centroid sub-pixel sample position using the centroid information.

Figure 5C:
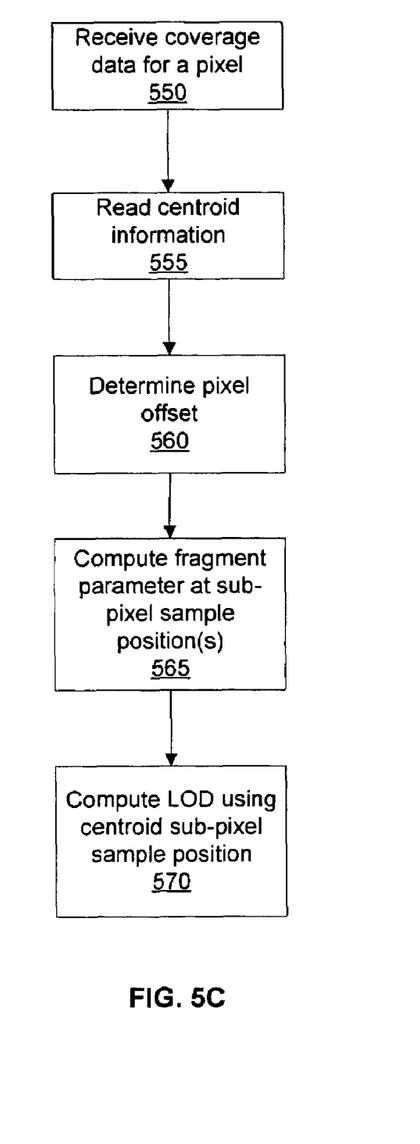
FIG. 5C illustrates an embodiment of method of determining a centroid sub-pixel sample position and computing fragment parameters in accordance with one or more aspects of the present invention.

FIG. 5C illustrates an embodiment of a method of determining a centroid sub-pixel position and computing fragment parameters in accordance with one or more aspects of the present invention. Steps 550, 555, and 560 proceed are previously described in conjunction with FIG. 5B. In step 565 Parameter Interpolation Unit 515 computes one or more fragment parameters using the pixel offset.

For each attribute, an interpolator computes a quad_center, the value at the center of a quad including 4 pixels arranged in a 2×2 square. The center of the quad is computed using the equation $$\text{quad\_center} = (x\text{quad\_center}-x\_\text{org})*ddx+(y\_\text{quad\_center}-y\_\text{org})*ddy+\text{base},$$

where (x_quad_center,y_quad_center) is the location of the quad center, ddx is the derivative of the attribute in the X direction, ddy is the derivative of the attribute in the Y direction, and base is the attribute value at the sample (x_org, y_org). A plane equation defines the fragment attribute values and (x_org, y_org) is the location of the plane equation origin. In some embodiments of the present invention, quad_center, ddy, ddx, and base are represented in a floating-point format and x_quad_center, y_quad_center, x_org, and y_org are represented in a fixed-point format.

The interpolator uses the quad center to compute the values of the four pixels, pixelN with N=0,1,2,3, using the equations $$pixelN = quad\_center + xcN*ddx + ycN*ddy,$$

where xcN and ycN are the pixel offset components represented as signed 3-bit values. Specifically, xcN is the distance in the X direction from the quad center to the sample point of pixel N and ycN is the distance in the Y direction from the quad center to the sample point of pixel N. In an alternate embodiment of the present invention the pixel offset components are represented as unsigned 3-bit values and different equations are used to compute each of the 4 pixels within the quad.

In step 570 Parameter Interpolation Unit 515 outputs the one or more fragment parameters and centroid information to Texture Map Unit 580 and LOD Unit 520 within Texture Map Unit 580 computes the texture map LOD for the fragment. Persons skilled in the art will appreciate that any system configured to perform the method steps of FIGS. 5B and 5C, or their equivalents, is within the scope of the present invention.

Figure 6A:
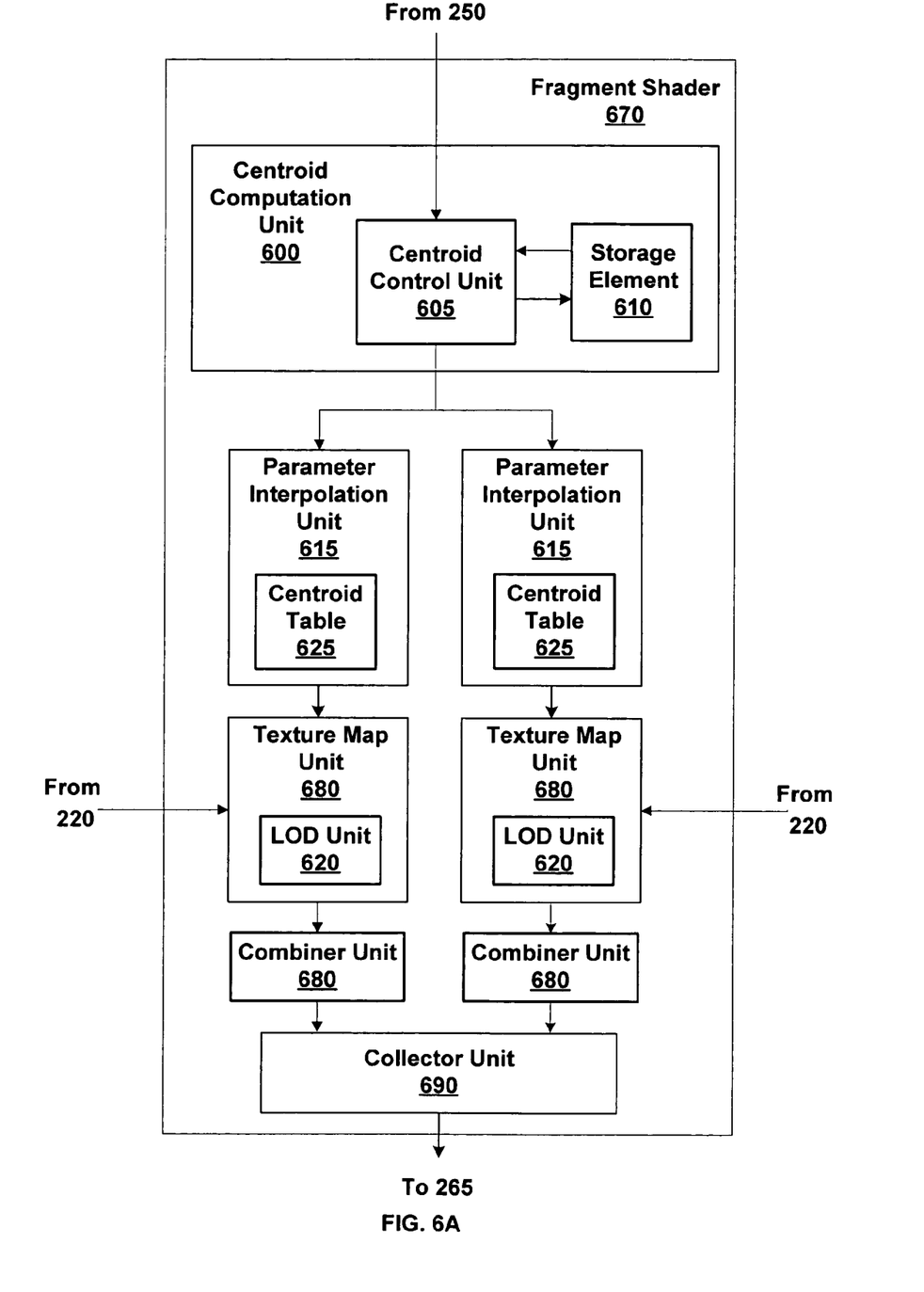
FIG. 6A is a block diagram of an exemplary embodiment of another fragment shader including another centroid computation unit in accordance with one or more aspects of the present invention.

FIG. 6A is a block diagram of another alternate embodiment of Fragment Shader 255, Fragment Shader 625, in accordance with one or more aspects of the present invention. An alternate embodiment of Centroid Computation Unit 500, Centroid Computation Unit 600 receives coverage data for a pixel from Rasterizer 250 and produces centroid information used to compute a centroid sub-pixel sample position. A Storage Element 610 within Centroid Computation Unit 600 receives the coverage data and the multisample mode from a Centroid Control Unit 605 and outputs centroid information, including a centroid index. Storage Element 610 may include one or more register file, read only memory (ROM), random access memory (RAM), and the like.

In one embodiment, each centroid index is 4 bits. Therefore, the centroid index may be represented in fewer bits than the pixel offset or the centroid sub-pixel sample position. For example, 6 bits may be used to represent the pixel center offset and 16 or more bits may be used to represent the centroid sub-pixel sample position. When the centroid information is passed through several pipeline stages it may be more efficient to pass the centroid index rather than the pixel offset or centroid sub-pixel sample position. The centroid index is effectively a compressed form of the centroid information. A Centroid Table 625 is used to decompress the centroid index to obtain the centroid information, as described further herein.

Centroid indices stored in Storage Element 610 may be static or programmed (determined and loaded by a software driver). Centroid Control Unit 605 generates a write control signal to load the centroid indices into Storage Element 610. When configured to write to Storage Element 610, Centroid Control Unit 605 receives each centroid index, address, and a write instruction from Rasterizer 250. Otherwise, Centroid Control Unit 605 receives fragment program instructions and fragment data from Rasterizer 250.

When the first multisample mode is used, and Sample Position 415 is covered by the fragment the centroid index is 15. Otherwise, when the first multsample mode is used and Sample Position 415 is not covered, the centroid index is 0. Texture samples are not read from memory for a fragment whose centroid index is set to 0, i.e., "killed." Table 4 includes an embodiment of the centroid indices, indexed using the coverage data, for the second multisample mode shown in FIG. 4B.

TABLE 4

Centroid indices for the second multisample mode

| Coverage data | Centroid index |
|---|---|
| No sample position | 0 |
| Sample Position 401 | 1 |
| Sample Position 404 | 4 |
| Sample Positions 401 and 404 | 15 |

Table 5 includes an embodiment of the centroid indices, indexed using the coverage data, for the third multisample mode shown in FIG. 4C.

TABLE 5

Centroid indices for the third multisample mode

| Coverage data | Centroid index |
|---|---|
| No sample position | 0 |
| Sample Position 401 | 1 |
| Sample Position 402 | 2 |
| Sample Position 403 | 3 |
| Sample Position 404 | 4 |
| Sample Positions 401 and 402 | 10 |
| Sample Positions 403 and 402 | 9 |
| Sample Positions 402 and 404 | 12 |
| Sample Positions 403 and 404 | 11 |
| Any 3 of 4 sample positions | 15 |
| All 4 sample positions | 15 |

Table 6 includes an embodiment of the centroid indices, indexed using the coverage data, for the fourth multisample mode shown in FIG. 4D.

TABLE 6

Centroid sub-pixel samples positions for the fourth multisample mode

| Coverage data | Centroid index |
|---|---|
| No sample position | 0 |
| Sample Position 405 | 5 |
| Sample Position 406 | 6 |
| Sample Position 407 | 7 |
| Sample Position 408 | 8 |
| Sample Positions 405 and 406 | 10 |
| Sample Positions 405 and 407 | 9 |
| Sample Positions 406 and 408 | 12 |
| Sample Positions 407 and 408 | 11 |
| Any 3 of 4 sample positions | 15 |
| All 4 sample positions | 15 |

Storage Element 610 outputs a centroid index to Centroid Control Unit 605. Centroid Control Unit 605 outputs the centroid index, fragment data, and fragment program instructions to a Parameter Interpolation Unit 615. A fragment shader, such as Fragment Shader 670, may include parallel subunits for processing fragment data, such as Parameter Interpolation Unit 615 and Texture Map Unit 680. Centroid Control Unit 605 may output centroid indices, fragment data, and fragment program instructions to two or more Parameter Interpolation Units 615.

Figure 6B:
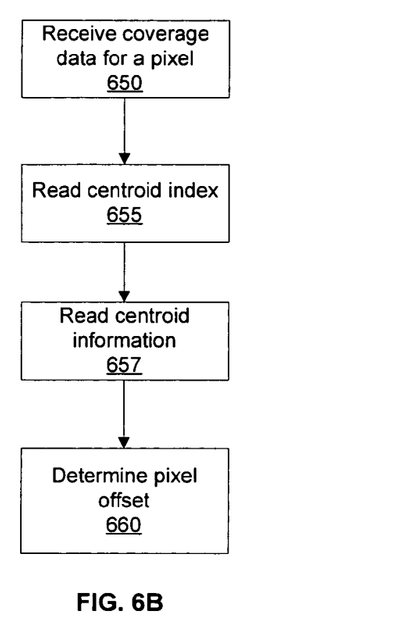
FIG. 6B illustrates an embodiment of another method of determining a centroid sub-pixel sample position in accordance with one or more aspects of the present invention.
Figure 6C:
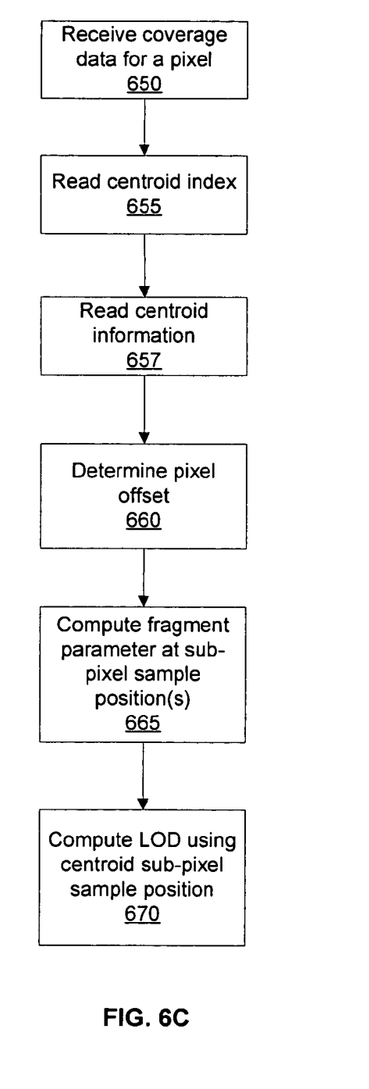
FIG. 6C illustrates an embodiment of a method of determining a centroid sub-pixel position and computing fragment parameters in accordance with one or more aspects of the present invention.

Parameter Interpolation Unit 615 computes one or more parameters for each fragment, as described in conjunction with FIG. 6C, and outputs fragment parameters and fragment program instructions to a Texture Map Unit 615. Centroid Table 625 may include one or more register file, ROM, RAM, and the like. Centroid Table 625 stores pixel offsets or centroid sub-pixel sample positions indexed using the centroid index. Table 7 includes pixel offsets indexed by centroid indices for an embodiment of Centroid Table 625.

TABLE 7

Pixel offsets corresponding to indices

| | Pixel offset | |
|---|---|---|
| Centroid Index | dx | dy |
| 0 | 0 = kill | 0 = kill |
| 1 | −2 | −2 |
| 2 | 2 | −2 |
| 3 | −2 | 2 |
| 4 | 2 | 2 |
| 5 | −1 | −3 |
| 6 | 3 | −1 |
| 7 | −3 | 1 |
| 8 | 1 | 3 |
| 9 | −2 | −1 |
| 10 | 1 | −2 |
| 11 | −1 | 2 |
| 12 | 2 | 1 |
| 13 | unused | unused |
| 14 | unused | unused |
| 15 | 0 | 0 |

The pixel offsets stored in Centroid Table 625 are used to compute fragment parameters. In one embodiment, Parameter Interpolation Unit 615 computes color parameters for the centroid sub-pixel sample position and texture parameters for each sub-pixel sample position specified by the multisample mode that is covered by the fragment. In another embodiment, Parameter Interpolation Unit 615 computes color parameters and texture parameters for each sub-pixel sample position specified by the multisample mode that is covered by the fragment.

In additional to the fragment parameters and fragment program instructions, in some embodiments, Parameter Interpolation Unit 615 outputs the centroid information to Texture Map Unit 680. In those embodiments, the centroid information is used by LOD (level of detail) Unit 620 to compute a texture map LOD, as previously described in conjunction with FIG. 5A. In an alternate embodiment of LOD Unit 620, LOD Unit 620 receives the centroid index and accesses a centroid table, such as Centroid Table 625 within LOD Unit 620 to obtain the pixel offset or centroid sub-pixel sample position to compute the texture map LOD.

Texture Map Unit 680 uses the fragment parameters computed using the centroid sub-pixel sample position and the texture map LOD to determine texture map coordinates and corresponding addresses, as described in conjunction with FIG. 5A. A Combiner Unit 680 combines the filtered texture sample with any other fragment data generated using the fragment parameters, such as color, and outputs processed fragment data to a Collector Unit 690. Collector Unit 690 collects the processed fragment data from each Texture Map Unit 680 and outputs the processed fragment data to Rasterizer 265.

FIG. 6B illustrates an embodiment of a method of determining a centroid sub-pixel position in accordance with one or more aspects of the present invention. In step 650 Centroid Computation Unit 600 receives coverage data for a pixel, specifically the coverage data indicates which sub-pixel positions within a pixel are within a fragment intersecting the pixel. In step 655 Centroid Control Unit 505 reads an entry in Storage Element 610 using the coverage data and multisample mode. In some embodiments Storage Element 610 includes a table for each multisample mode, such as Tables 4, 5, and 6. In other embodiments a single table includes the centroid indices for several multisample modes.

In step 657 Centroid Control Unit 605 receives the centroid index and outputs the centroid index to Parameter Interpolation Unit 615. Parameter Interpolation unit 615 reads centroid information, e.g., a pixel offset or centroid sub-pixel sample position from Centroid Table 625 using the centroid index. In step 660 Parameter Interpolation Unit 615 determines the pixel offset using the centroid information. In an alternate embodiment Parameter Interpolation Unit 615 determines the centroid sub-pixel sample position using the centroid information.

FIG. 6C illustrates an embodiment of a method of determining a centroid sub-pixel position and computing fragment parameters in accordance with one or more aspects of the present invention. Steps 650, 655, 657, and 660 proceed are previously described in conjunction with FIG. 6B. In step 665 Parameter Interpolation Unit 515 computes one or more fragment parameters using the pixel offset. Fragment parameters may be computed at one or more sub-pixel sample positions, including the centroid sub-pixel sample position.

In step 670 Parameter Interpolation Unit 615 outputs the fragment parameter and centroid information to Texture Map Unit 680 and LOD Unit 620 within Texture Map Unit 680 computes the texture map LOD for the fragment. Persons skilled in the art will appreciate that any system configured to perform the method steps of FIGS. 6B and 6C, or their equivalents, is within the scope of the present invention.

The invention has been described above with reference to specific embodiments. Persons skilled in the art will recognize, however, that various modifications and changes may be made thereto without departing from the broader spirit and scope of the invention as set forth in the appended claims. For example, in alternative embodiments, the techniques for computing a displaced pixel center and determining a centroid sub-pixel sample position set forth herein may be implemented either partially or entirely in a shader or other graphics program. The foregoing description and drawings are, accordingly, to be regarded in an illustrative rather than a restrictive sense. The listing of steps in method claims do not imply performing the steps in any particular order, unless explicitly stated in the claim. Within the claims, element lettering (e.g., "a)", "b)", "i)", "ii)", etc.) does not indicate any specific order for carrying out steps or other operations; the lettering is included to simplify referring to those elements.

The invention claimed is:

1. A method of determining a centroid sub-pixel sample position within a fragment, comprising:
   receiving coverage data for a pixel representing one or more sub-pixel sample positions within a fragment;
   determining centroid information, including a centroid index, based on comparing the coverage data and a selected one of a plurality of multisample modes to the fragment, wherein the selected multi-sample mode includes one of a plurality of sub-pixel sample positions and the centroid is uniquely determined by the selected multi-sample mode;
   computing the centroid sub-pixel sample position based on the centroid information by reading a pixel center offset from a table using the centroid index;
   applying the pixel center offset to a pixel center position to compute the centroid sub-pixel sample position;
   determining whether the centroid sub-pixel sample position is covered by the fragment; and
   outputting the fragment from the fragment shader to a texture map unit only if the centroid sub-pixel sample position is covered by the fragment.

2. The method of claim 1, wherein the centroid information includes a pixel center offset.

3. The method of claim 2, wherein the step of computing includes applying the pixel center offset to a pixel center position of the pixel to compute the centroid sub-pixel sample position.

4. The method of claim 1, wherein the step of computing includes reading the centroid sub-pixel sample position from another table using the centroid index.

5. The method of claim 1, wherein the centroid information includes the centroid sub-pixel sample position.

6. The method of claim 1, further comprising the step of writing the centroid information to the table.

7. The method of claim 1, further comprising computing a texture coordinate using the centroid sub-pixel sample position.

8. The method of claim 1, further comprising the step of computing a texture map level of detail based on the centroid information.

9. The method of claim 1, wherein the step of determining includes reading the centroid information from a table.

10. A centroid computation unit, comprising:
- a storage element configured to store centroid information;
- a centroid control unit configured to read the centroid information based on a multisample mode and coverage data associated with a fragment; and
- a parameter computation unit that is coupled to the centroid control unit and configured to compute a fragment parameter based on the centroid information, the parameter computation unit further being coupled to a texture coordinate computation unit configured to compute a texture map level of detail for the fragment based on the centroid information, wherein the centroid computation unit is included within a fragment shader configured to receive fragment data and produce processed fragment data.

11. The centroid computation unit of claim 10, wherein the parameter computation unit includes a centroid table configured to store additional centroid information including sub-pixel sample position.

12. The centroid computation unit of claim 10, wherein the fragment parameter is a texture map coordinate.

13. The centroid computation unit of claim 10, wherein the centroid control unit is configured to write the centroid information to the storage element.

14. The centroid computation unit of claim 11, wherein the centroid information includes a pixel center offset.

15. The centroid computation unit of claim 14, wherein the parameter computation unit is further configured to apply the pixel center offset to a pixel center position of the pixel to compute the centroid sub-pixel sample position.

16. The centroid computation unit of claim 11, wherein the parameter computation unit is further configured to read the centroid sub-pixel sample position from another table using the centroid index.

17. A centroid computation unit, comprising:
- a storage element configured to store centroid information;
- a centroid control unit configured to read the centroid information based on a multisample mode and coverage data associated with a fragment; and
- a parameter computation unit that is coupled to the centroid control unit and configured to compute a fragment parameter based on the centroid information, the parameter computation unit further being coupled to a texture coordinate computation unit configured to compute a texture map level of detail for the fragment based on the centroid information, wherein the centroid computation unit is included within a fragment shader configured to receive fragment data and produce processed fragment data, and wherein the centroid computation unit is coupled to a rasterizer that is configured to produce the coverage data.

18. A method as claimed in claim 1 wherein the texture map unit computes a level of detail for each output fragment using the centroid sub-pixel sample position.

\* \* \* \* \*